United States Patent
Lincoln et al.

(10) Patent No.: US 7,605,223 B1
(45) Date of Patent: Oct. 20, 2009

(54) LOW MELT VISCOSITY IMIDE OLIGOMERS AND POLYIMIDES THEREFROM

(75) Inventors: Jason E. Lincoln, Englewood, OH (US); David B. Curliss, Beavercreek, OH (US)

(73) Assignee: Performance Polymer Solutions, Inc., Centerville, OH (US)

( * ) Notice: Subject to any disclaimer, the term of this patent is extended or adjusted under 35 U.S.C. 154(b) by 517 days.

(21) Appl. No.: 11/233,187

(22) Filed: Sep. 22, 2005

Related U.S. Application Data

(60) Provisional application No. 60/612,932, filed on Sep. 24, 2004.

(51) Int. Cl.
  *C08G 73/10* (2006.01)
  *C08G 69/26* (2006.01)
  *C08G 73/12* (2006.01)
  *C08G 73/14* (2006.01)

(52) U.S. Cl. .................. 528/340; 528/345; 528/347; 528/348; 528/350; 528/353

(58) Field of Classification Search ................ 528/340, 528/345, 347, 348, 350, 353
See application file for complete search history.

(56) References Cited

U.S. PATENT DOCUMENTS

| | | |
|---|---|---|
| 5,138,028 A | 8/1992 | Paul et al. |
| 5,493,002 A | 2/1996 | McGrath et al. |
| 5,567,800 A | 10/1996 | Hergenrother et al. |
| 5,681,967 A | 10/1997 | Hergenrother et al. |
| 5,760,168 A | 6/1998 | Hergenrother et al. |

*Primary Examiner*—Ana L Woodward
(74) *Attorney, Agent, or Firm*—Colin L. Fairman; Fulbright & Jaworski LLP

(57) ABSTRACT

The present invention relates to novel imide oligomer compositions, polyimides formed therefrom, and methods for making and using the same. In particular, the invention relates to novel polyimide oligomers comprising 3,3',4,4'-benzophenone tetracarboxylic dianhydride (BTDA), 2-(3,4-dicarboxyphenyl)-1-phenylacetylene anhydride (PE), and a mixture of 1,3-diaminobenzene and 4,4'-(1,3-phenylenediisopropylidene) bisaniline. The polyimide oligomers demonstrate low melt viscosity (these resins are melt processable) while retaining exceptional thermo-oxidative stability, high glass transition temperature, and good mechanical properties in the cured state.

6 Claims, 4 Drawing Sheets

LOW MELT VISCOSITY IMIDE OLIGOMERS AND POLYIMIDES THEREFROM

CROSS-REFERENCE TO RELATED APPLICATIONS

The present application claims the benefit of U.S. Provisional application 60/612,932, filed Sep. 24, 2004, which is incorporated herein by reference in its entirety for all purposes.

FIELD OF THE INVENTION

The present invention relates to novel imide oligomer compositions, polyimides formed therefrom, and methods for making and using the same. In particular, the invention relates to novel polyimide oligomers comprising 3,3',4,4'-benzophenone tetracarboxylic dianhydride (BTDA), 2-(3,4-dicarboxyphenyl)-1-phenylacetylene anhydride (PE), and a mixture of 1,3-diaminobenzene and 4,4'-(1,3-phenylenediisopropylidene) bisaniline.

BACKGROUND OF THE INVENTION

Polyimides are synthetic organic resins characterized by repeating imide linkages in the polymer chain which may or may not be end-capped with polymerizable or inert (i.e., non-polymerizable) chemical groups. Polyimides exist in both linear and cross linked forms and are noted for their outstanding chemical and physical properties, particularly their high temperature oxidative stability and strength. In addition to their use as adhesives and molded articles, polyimides may be used as precured films and fibers, curable enamels, laminating resins, and as matrices for fiber reinforced composites.

The objective in polyimide structure-property-process engineering has been to obtain materials which exhibit high temperature stability; strength or toughness, and processability. Where high use temperature is required, the polyimide must have a high glass transition temperature as well as sufficient thermo-oxidative stability below its glass transition temperature. While many aromatic polyimides have some of the highest use temperatures, previous polyimides generally do not possess all three desired properties. In particular, recent advances in composite fabrication processes (e.g. liquid molding processes such as resin transfer molding (RTM) and resin infusion (RI)), has resulted in the need for polyimides that retain the excellent thermal and mechanical characteristics of traditional polyimides but exhibit significantly lower melt viscosities. The materials described in this invention possess high glass transition temperatures, excellent mechanical properties, excellent thermo-oxidative stability, and are suitable for RTM and resin infusion composite fabrication procedures.

Unlike autoclave fabrication procedures traditionally used to fabricate polyimide composite components, RTM and RI are essentially solvent-free processes which impart significant cost advantages and component design flexibility. RTM and RI enable fabrication of highly complex shapes that would otherwise be extremely difficult or not possible using solvent based prepreg or tape/tow placement techniques. Typically, these melt infusion processes involve the placement of a textile preform or mat (e.g. carbon, glass, ceramic, etc.) in a mold cavity which is subsequently injected or infused with liquid resin at an elevated temperature, usually under reduced pressure. The molten resin permeates through the woven preform to completely wet out the preform, followed by increasing the temperature to chemically crosslink or "cure" the thermoset resin. During this step, external hydrostatic pressure is often applied to the mold to ensure consolidation. In this process it is important that no volatiles are present (as residual solvent, chemical defects, or residual condensation reactions) since these volatiles will result in composite voids which ultimately reduce the properties of the finished component. These features are generally difficult to achieve with polyimide resins. Commercial resins, including vinyl esters, epoxies, and bismaleimides are available that are processable by RI and/or RTM but are limited in use temperature relative to the aromatic imide based materials described in this patent.

Oligomeric addition polyimides comprised of aromatic dianhydrides, aromatic diamines, and terminated with aromatic end-capping agents are generally described in prior patent literature (U.S. Pat. No. 5,138,028). What is described in this present patent is a preferred composition for an imide oligomer that exhibits a number of novel and advantageous processing characteristics while maintaining good thermal and mechanical properties. This present invention exhibits unanticipated improvements in properties and processing characteristics, as compared to state-of-the-art polyimides, that are particularly advantageous in the manufacture and use of fiber reinforced composites materials manufactured by liquid molding processes.

U.S. Pat. No. 6,359,107 discloses low molecular weight imide oligomers suitable for RTM and RI processes based on a flexible diamine (selected from the group consisting of: 1,3-bis(3-aminophenoxy)benzene and 1,3-bis(4-aminophenoxy)benzene) and a rigid diamine (selected from the group consisting of: 1,3-diaminobenzene, 9,9'-bis(4-aminophenyl)fluorine, and 3,4'-diaminodiphenyl ether). Using a phenylethynyl functional reactive terminal group, said combination of diamines, and an aromatic dianhydride selected from the group consisting of: 3,3',4,4'-biphenyltetracarboxylic dianhydride, 4,4'-oxydiphthalic anhydride, pyromellitic dianhydride, and 4,4'-biphenoxydiphthalic anhydride, the inventors were able to achieve imide oligomer compositions with low melt viscosity (described as less than 60 Poise at temperatures less than 300° C.) and high glass transition temperatures (>250° C.). To achieve these values required very low oligomeric molecular weights (stoichiometric ratio of 0.19 to 0.72 for dianhydride to diamine), concentration of the rigid diamine of less than 50% (molar) of the total diamines, and cure temperatures greater than approximately 350° C.

U.S. Pat. No. 6,184,333 discloses low toxicity high temperature thermoset polyimides that utilize a diamine selected from the group consisting of 4,4'-[1,4-phenylene-bis(1-methylethylidene)] bisaniline and 4,4'-[1,3-phenylene-bis(1-methylethylidene)] bisaniline. These thermoset polyimides and imide oligomers do not use a diaryl substituted acetylene as an end-capping agent.

As the artisan will appreciate, there remains a need for improved imide oligomers that can be used to fabricate composite materials with an overall combined improvement in toughness, mechanical performance, thermo-oxidative stability, higher glass transition temperature, lower cost, and lower cure temperature than state-of-the-art melt processable imide oligomers.

SUMMARY OF THE INVENTION

The present invention constitutes a new composition of imide oligomers and methods for making and using the same that exhibit a unique combination of properties that make them particularly useful for RTM and RI composite fabrication. These materials can be readily prepared in volatile free form, exhibit the proper flow, melt stability, and cure characteristics suitable for RTM or RI processes. In addition, these materials can be used to fabricate composite materials with an overall combined improvement in toughness, mechanical performance, thermo-oxidative stability, higher glass transition temperature, lower cost, and lower cure temperature than current state-of-the-art melt processable imide oligomers, such as those described in U.S. Pat. Nos. 6,359,107 and 6,184,333.

In one aspect, the present invention provides novel polyimide oligomers comprising 3,3',4,4'-benzophenone tetracarboxylic dianhydride, 2-(3,4-dicarboxy phenyl)-1-phenylacetylene anhydride, and a mixture of 1,3-diaminobenzene and 4,4'-(1,3-phenylenediisopropylidene) bisaniline, demonstrating low melt viscosity (suitable for RTM and RI) while maintaining excellent mechanical and thermal properties.

In a first embodiment, the present invention is directed to polyimide oligomers having the general formula:

[PE]-[AB]$_n$-A-[PE]

wherein: A is a mixture of 1,3-diaminobenzene and 4,4'-(1, 3-phenylenediisopropylidene) bisaniline; B is 3,3',4,4'-benzophenone tetracarboxylic dianhydride; (AB)$_n$ is the reaction product of A and B; n is 0.8 to approximately 2; and PE is the 2-(3,4-dicarboxy phenyl)-1-phenylacetylene anhydride functional end-capping agent. The oligomer according to the invention exhibits a glass transition temperature greater than 300° C. after reaction of the PE groups. The imide oligomer described has a low enough melt viscosity for resin transfer molding and similar composite fabrication processes (<60 Poise). Also, the described polyimide may be fully cured at temperatures as low as 316° C. (600° F.), which is a significant advantage over other polyimides terminated with PE that require much higher cure temperatures, such as those described in U.S. Pat. Nos. 6,359,107 and 5,138,028.

In a preferred embodiment, the ratio 1,3-diaminobenzene to 4,4'-(1,3-phenylenediisopropylidene) bisaniline is approximately 0.43:1 to 2.33:1.

In another embodiment, the invention provides a polymerizable monomeric resin (PMR) solution of A, B and PE, wherein A, B and PE are defined as set forth above to produce a polyimide oligomer according to the invention upon imidization of A, B and PE groups. Such a PMR solution is produced by a method according to the invention comprising steps of: (a) in a first reaction, esterifying BTDA in a suitable solvent to form a corresponding diester-diacid and, (b) also in the same reaction vessel or independently, esterifying PE to form a corresponding ester-acid; and (c) subsequently adding the mixture of aromatic diamines to the mixed products of (a) and (b) to provide a PMR solution according to the invention. In preferred methods, the reactions (a) and (b) of the above-described methods is carried out in an alcohol or a mixture of alcohol and other inert solvents.

The invention further provides the corresponding resin solutions and imidized solid and methods of preparing the respective resin solutions and imidized solid in order that the polyimide oligomer described in the preceding paragraph may be manufactured. Such resin solutions are particularly useful coating reinforcing fibers with polyimide oligomers according to the invention in the manufacture of composite prepregs. Such imidized solids are useful as molding compounds for RI and RTM.

Other objects, features and advantages of the present invention will become apparent after review of the detailed description and appended claims.

DETAILED DESCRIPTION OF THE INVENTION

Figure 1:
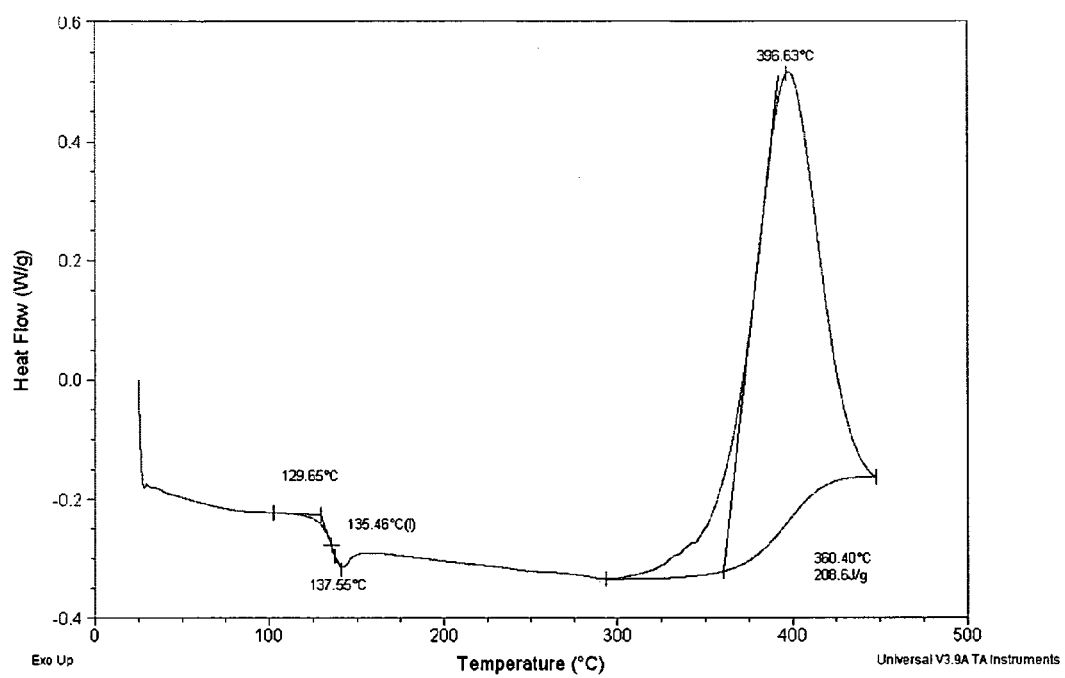
FIG. 1. Differential scanning calorimetry trace of imidized oligomer of Example 2.

The present invention utilizes two aromatic diamines, a tetracarboxylic acid dianhydride and 2-(3,4-dicarboxy phenyl)-1-phenylacetylene anhydride as starting materials for forming polyimide oligomers according to the present invention. The polyimide oligomers described and claimed herein provide improvements over previously known polymers including, but not limited to, PMR-15, AFR700B, PMR-II-50, RP-46, AFRPE®, AFR-PE-4, Avimid® R, Avimid® RB, Avimid® N, MVK-10.8, PETI-298, and PETI-330.

Organic diamines useful in the present invention include:

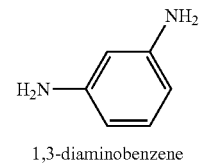

1,3-diaminobenzene

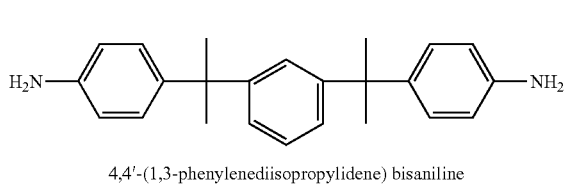

4,4'-(1,3-phenylenediisopropylidene) bisaniline

Tetracarboxylic dianhydrides useful in the present invention include:

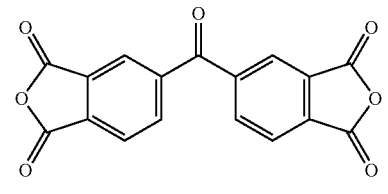

3,3',4,4'-benzophenone tetracarboxylic dianhydride

The preferred end-capping group useful in the invention is 2-(3,4-dicarboxy phenyl)-1-phenylacetylene anhydride, shown below.

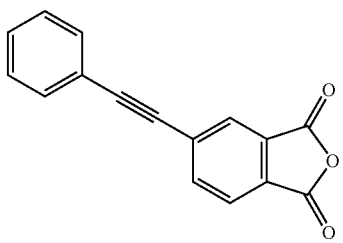

2-(3,4-dicarboxy phenyl)-1-phenylacetylene anhydride

As is well known, corresponding acids, esters, diacids-diesters, or dihaloformyl diesters of the above-described dianhydrides may also be used in the preparation of the polyimide oligomers cited herein.

In general, the PE end-capped polyimide oligomers according to the invention are prepared by reacting stoichiometric equivalents of the diamines described herein with the above tetracarboxylic acid dianhydride and the PE end-capping reagent described above in a suitable solvent to provide a polyimide oligomer having the general structure:

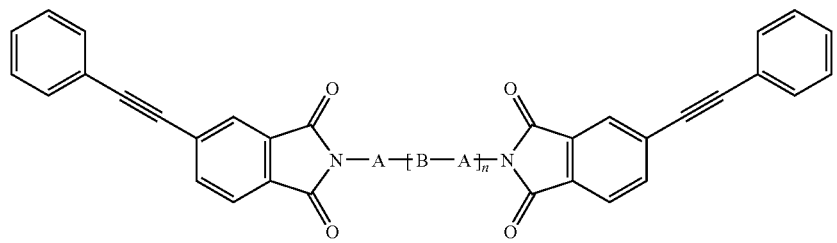

in which A is a mixture of the diamines described herein, B is the tetracarboxylic acid dianhydride described herein, A and B are shown in chemically-reacted fashion in the general structure, and n is a number representing the average repetitive unit of the oligomeric backbone. It is understood that common derivatives of the tetracarboxylic acid dianhydrides which react with the aromatic diamines in a similar fashion may also be used. Such common derivatives of the dianhydrides would include, but are not limited to the tetra acids, tetra esters, diester-diacids, and dihalo formyl esters.

In another procedure it is possible to prepare the PE-capped polyamic ester oligomers. The polyamic ester oligomers are prepared as described above in the procedure for the polyamic acid oligomers except that the common derivatives of the dianhydrides such as the tetra esters, the diester-diacids, and the dihaydl formal-diesters are used instead of the dianhydrides. The polyamic ester oligomers can then be thermally or chemically cyclized to the polyimide oligomers through condensation reactions.

In yet other methods according to the invention, the novel polyimides described herein may also be prepared and processed through the use of monomeric mixtures, also termed polymerizable monomeric resin (PMR) solutions. Preparation of certain polyimides via PMR solutions have been described before. (See, e.g., W. B. Alston, "Replacement of MDA With More Oxidatively Stable Diamines In PMR Polyimides", in *High Temperature Polymer Matrix Composites*, T. T. Serafini, Ed., Noyes Data Core, Parkridge, N.J. 1987, p. 186). For example, the dianhydride and PE are added to an alcohol and the solution is heated to form the diester-diacid of the dianhydride, as shown below.

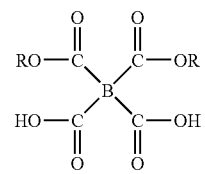

The diester-diacid of the dianhydride is soluble in the alcohol. The aromatic diamines are then added to the alcohol solution, preferably a mixture of 1,3-diaminobenzene and 4,4'-(1,3-phenylenediisopropylidene) bisaniline, to form a resin solution which, upon imidization, provides a polyimide oligomer characterized by a selected stoichiometric ratio. The most preferred stoichiometric ratio of 1,3-diaminobenzene to 4,4'-(1,3-phenylenediisopropylidene) bisaniline is 1:1. The repeat length n of polyimide oligomers prepared by PMR solutions according to the invention may range from 0.8 to 2, preferably 1 to 2, and most preferably 1. The solution is a monomeric mixture which can be very useful from a processing standpoint due to its low viscosity at high solids relative to polymeric solutions. The polyimide is obtained during the processing procedure which involves heating the monomeric mixture in stages under predetermined processing conditions up to temperatures at or near 280° C. Further heating results in the cured polyimide.

Polyimide oligomers formed by PMR solutions according to the invention have been shown by the inventors to result in fiber reinforced prepregs with unexpectedly superior processing characteristics and properties as compared to previously known materials. The alcohol solvent used in the presently-described approach is readily evaporated during processing allowing the manufacture of thick void-free components as compared to previously-known materials due to the low melt viscosity of the resin. In summary, the polymers resulting from the technology described and claimed herein exhibit processing characteristics and properties affording the manufacture of complex structural components, in particular aerospace components.

Various other additives known to the skilled practitioner may also be incorporated in the PMR and molding powder/solid compositions such as thickeners, plasticizers, inert fillers, or reinforcing fibers.

The novel polyimide oligomers provided herein can be used as liquid molding compounds either with or without fillers, reinforcing fibers, or other useful additives well known to those skilled in the art. The molding compounds are used to form cured molded parts by suitable application or heat and pressure. Various molding techniques well known to those skilled in the art can be used, such as injection molding, compression molding, resin transfer molding, and resin infusion. In all of these applications, the ability to cure these materials at temperatures as low as 316° C. (600° F.) is very important. It allows wider applicability to existing molding equipment limitations (e.g. seals and transfer lines), autoclaves, and tools. Also, the low melt viscosity of the novel polyimides described herein allows easier consolidation in either PMR solutions or as a molding powder for liquid molding applications.

As well, the polyimide oligomers described herein may be combined with additional components and formed into foam useful in filling spaces and voids in structural components used at high temperatures. Methods of forming such foams are well known in art.

In addition, the novel polyimides described herein are manufactured from relatively inexpensive commercially available raw materials, as opposed to costly and custom synthesized monomers common with other high performance polyimides.

The preferred procedures for the preparations of polyimide oligomers according to the invention are provided in the following examples. All monomers and reagents are available from commercial sources and/or their chemical syntheses are well known to the artisan. These examples are provided for illustrative purposes and in no way limit the present invention.

EXAMPLE 1

Preparation of a PMR Resin Solution

An example of a polymerizable monomer reactant (PMR) resin solution is detailed in this example. The resin prepared using this procedure was directly used in the manufacture of an imidized solid.

1. 7000 grams of anhydrous ethanol was weighed into a 20L cylindrical jacketed reaction flask fitted with a stirring paddle and condenser. To the ethanol, 3295.53 grams of 3,3', 4,4'-benzophenone tetracarboxylic dianhydride (BTDA) and 5077.43 grams of 2-(3,4-dicarboxy phenyl)-1-phenylacetylene anhydride (PE) are added as solids. The flask was kept under nitrogen purge. The flask was heated to reflux and heated for an additional 1.5 hours after the solution cleared. The solution was then cooled to 40° C.

2. 1105.98 grams of 1,3-diaminobenzene and 3523.29 g of 4,4'-(1,3-phenylenediisopropylidene) bisaniline were added to the 20L reaction flask maintained at 40° C. The flask was kept under nitrogen purge. The mixture was stirred until all of the diamines were dissolved.

3. The resin solution from step 2 was then filtered to remove any undissolved solids. The resin prepared in this manner was directly usable for prepregging with the following characteristics: approximately 61 w/w net cured solids; n=1 average degree of oligomerization; and stoichiometric ratio of monomers 1:2:1:1 (BTDA:PE: 1,3-diaminobenze: 4,4'-(1,3-phenylenediisopropylidene) bisaniline).

EXAMPLE 2

Preparation of Imidized Molding Compound

An example of an imidized molding compound is detailed in this example. The imidized oligomer prepared in this example was used directly in the RTM fabrication of a composite laminate.

1. 1 kg of the resin solution of Example 1 was placed into glass trays lined with Teflon® and heated under vacuum (trapping removed ethanol in a vacuum trap). Imidization was completed by heating sequentially to 100° C. for 8 hours, 200° C. for 2 hours, 240° C. for 4 hours, and 260° C. for 4 hours.

2. The solid was cooled to room temperature and removed, yielding a brittle solid of red/amber color useful for liquid molding.

EXAMPLE 3

Preparation of Polyamic Acid Precursor Solution 1. 12000 grams of 1-methyl-2-pyrrolidinone (NMP) was weighed into a 20L cylindrical jacketed reaction flask fitted with a stirring paddle and condenser. To the NMP, 131.22 grams of 1,3-diaminobenzene and 672.03 grams of 4,4'-(1,3-phenylenediisopropylidene) bisaniline were dissolved.

2. In a separate vessel under stirring and nitrogen purge, a solution of 6000 grams NMP and 488.74 grams 3,3',4,4'-benzophenone tetracarboxylic dianhydride (BTDA) was prepared.

3. The NMP/BTDA solution was added dropwise to the NMP/diamine solution over a period of 4 hours using an addition funnel. The solution was allowed to mix for 1 hour.

4. To the NMP oligomeric amic acid solution was added 753.01 grams of 2-(3, 4-dicarboxy phenyl)-1-phenylacetylene anhydride (PE) as solid. The entire solution was allowed to mix for an additional 4 hours.

5. The oligomeric amic acid resin solution from step 4 was then filtered to remove any undissolved solids. The resin prepared in this manner was directly usable for prepregging, coating, or forming the imide oligomer through imidization techniques common to the skilled practitioner, with the following characteristics: n=1 average degree of oligomerization; and stoichiometric ratio of monomers 1:2:0.8:1.2 (BTDA: PE: 1,3-diaminobenze: 4,4'-(1,3-phenylenediisopropylidene) bisaniline).

EXAMPLE 4

Characterization of Imide Oligomer

The imidized oligomer prepared in Example 2 was characterized by differential scanning calorimetry (DSC), parallel plate rheology, and melt viscosity by the Brookfield method.

FIG. 1 displays the dynamic DSC trace of the imidized oligomer of Example 2, demonstrating a large processing window between the oligomer "melt" temperature and reaction onset point due to phenylethynyl crosslinking.

Figure 2:
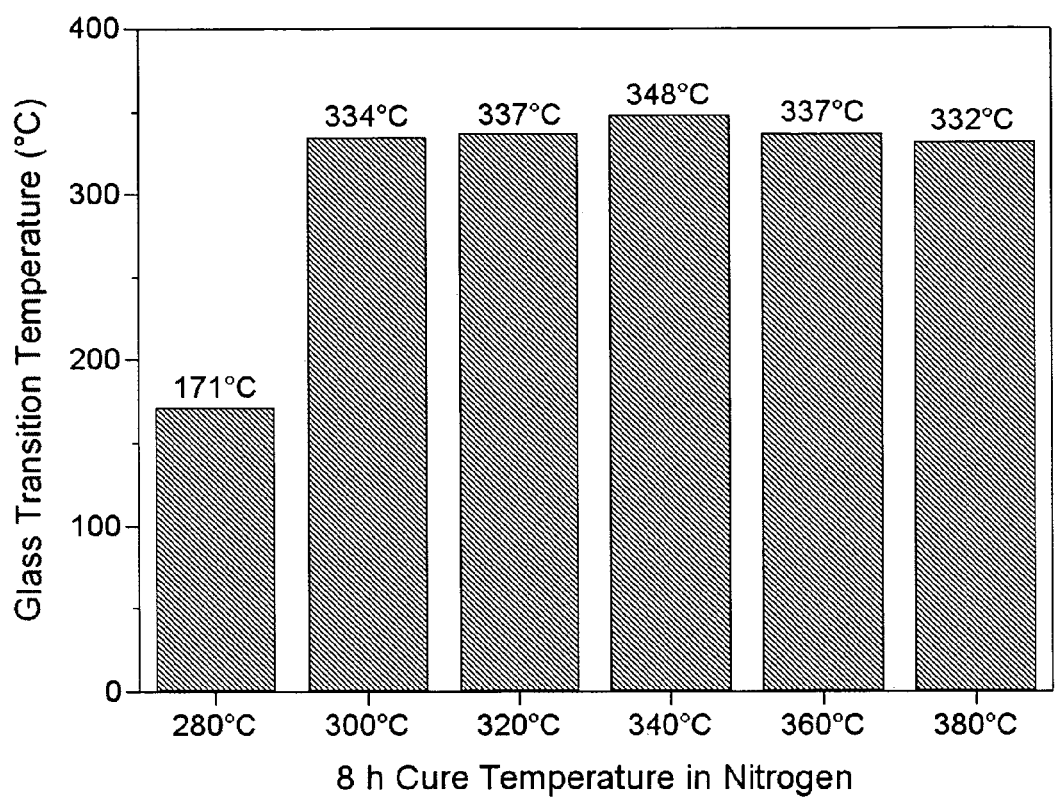
FIG. 2. Glass transition temperature as a function of cure time for the imidized oligomer of Example 2.

FIG. 2 displays the glass transition temperature as measured via DSC for imidized oligomer specimens cured for 8 hours at various temperatures ranging from 280° C. to 380° C. These results demonstrate the excellent melt stability up to 280° C. and ability for the resin to be fully cured at temperatures as low as 300° C.

Figure 3:
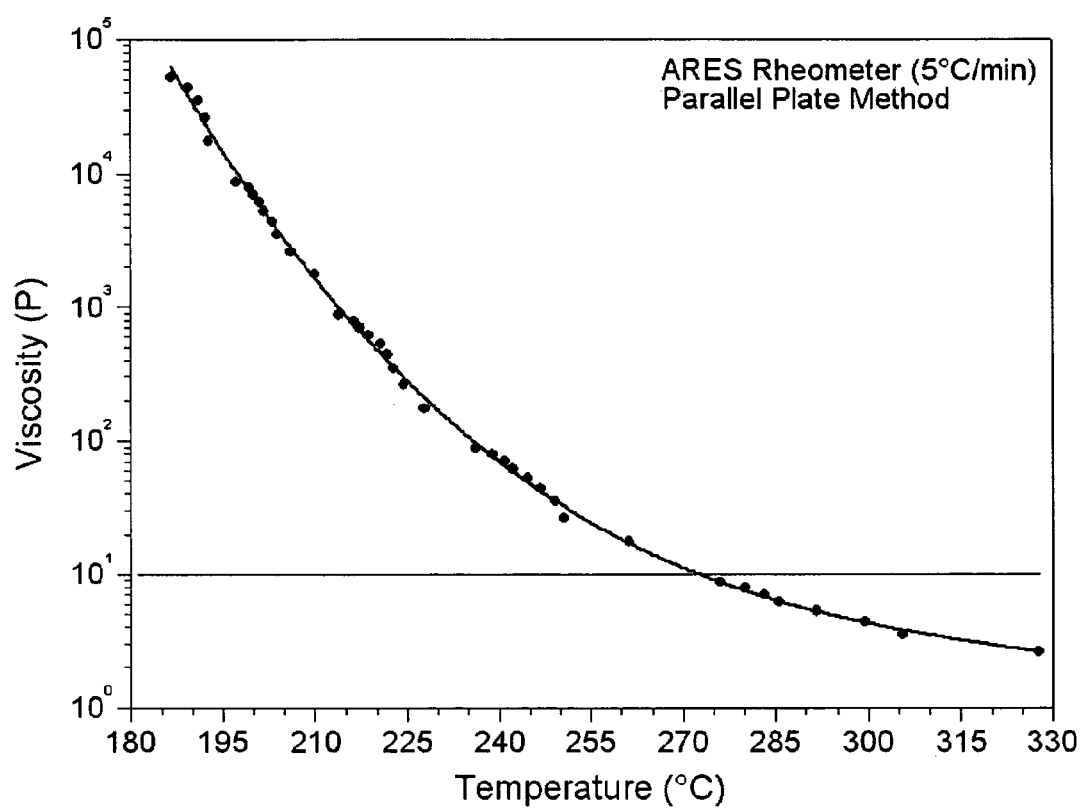
FIG. 3. Dynamic melt viscosity of the imidized oligomer of Example 2.

FIG. 3 displays the dynamic melt viscosity of the oligomer heated at 5° C./min via the parallel plate technique. The melt viscosity drops to below 10 Poise above 270° C., which is well suited for RTM processing.

Figure 4:
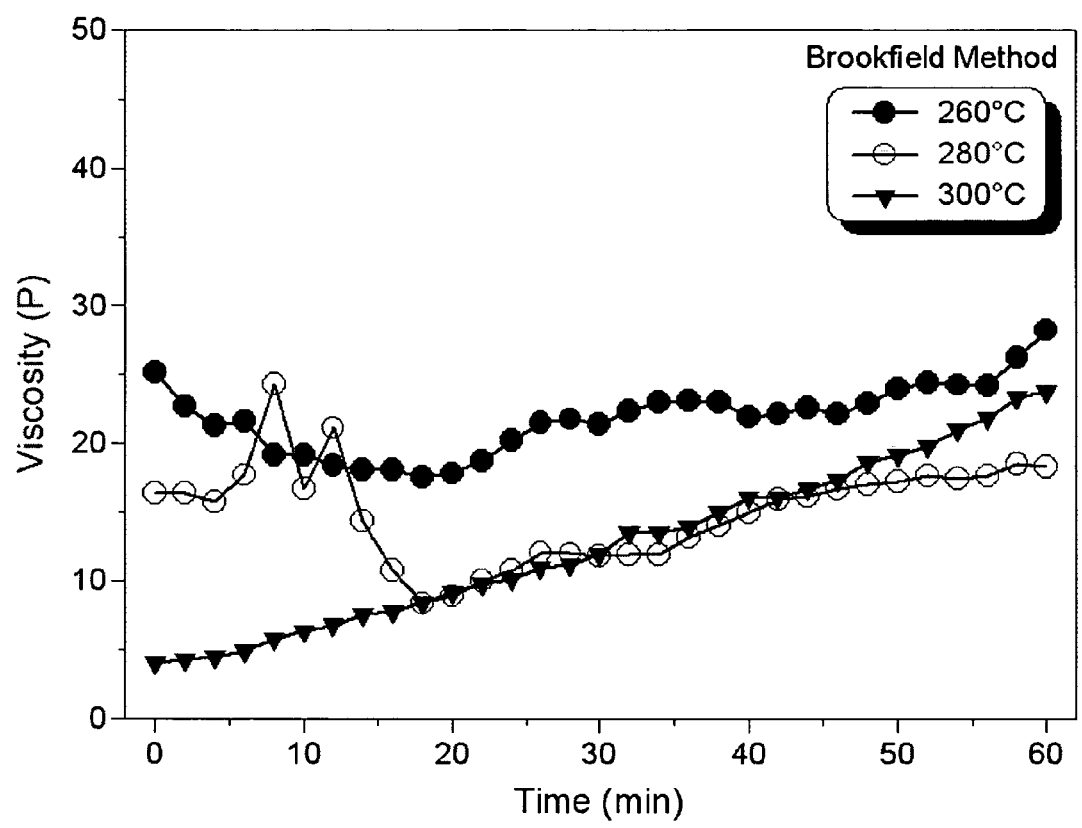
FIG. 4. Isothermal melt viscosity of the imidized oligomer of Example 2.

FIG. 4 displays the isothermal melt viscosity of the imidized oligomer of Example 2 at temperatures of 260° C., 280° C., and 300° C. In all cases after 60 minutes the melt viscosity remains below 30 Poise, demonstrating the excellent melt stability of the imidized oligomer.

EXAMPLE 5

RTM Fabrication of a Composite Laminate

This example details the fabrication of a composite laminate using the imidized oligomer of Example 2 and 8 harness T650-35 carbon textile as reinforcement.

Into a high temperature RTM mold assembly were placed 8 plies of T650-35 8 harness satin fabric stacked in a warp-aligned, nested configuration. The mold was vacuum sealed and pre-heated to 290° C. The high temperature resin pot was charged with imidized oligomer solid of Example 2 and degassed at 270° C. under vacuum for 1 hour. Next, the heated transfer line was opened and the resin infused into the preform. The mold was heated slowly to 371° C., 200 psi pressure applied, and the laminate allowed to cure for 1.5 hours. After cure, the laminate was cooled to ~100° C. at 1° C./min, then removed from the mold, yielding a composite laminate that was found to have a void content of less than 1%, fiber volume fraction of ~54%, be free of microcracks, and a possessed a glass transition temperature (measured via dynamic mechanical analysis, storage modulus) of 340° C.

EXAMPLE 6

Mechanical Property and Durability Characterization

The mechanical performance and thermo-oxidative stability of the composite laminate of Example 5 is given in this example.

The composite laminate fabricated in Example 5 was sectioned for mechanical testing and environmental aging. The two environmental aging conditions included a 316° C./100 h air exposure and a 288° C./646 h air exposure in a convection oven. No microcracking was observed after either environmental aging condition. Mechanical properties (flexural strength and interlaminar shear strength) were measured at 23° C. and 288° C. Flexural strength was measured according to ASTM D790 and interlaminar shear strength (ILSS) measured by ASTM D2344. The results are summarized in Table I.

TABLE I

Mechanical test results for composite laminate of Example 5.

| Aging Condition | Flexural Strength (MPa) | | Interlaminar Shear Strength (MPa) | |
|---|---|---|---|---|
| | 23° C. | 288° C. | 23° C. | 288° C. |
| Control | 935 ± 55 | — | 83.5 ± 11 | — |
| 316° C./100 h | 799 ± 47 | — | 71.2 ± 4.2 | — |
| 288° C./646 h | 752 ± 31 | 621 ± 17 | 43.4 ± 1.2 | 41.4 ± 1.0 |

While the present invention has been described with particular reference to specific examples, it is not to be limited thereby but reference is to be had to the appended claims for definition of its scope. All publications explicitly mentioned herein are incorporated by reference into the present disclosure for the purpose of describing and disclosing the methods and materials which are reported in the publications which might be related to the invention. Nothing herein is to be construed as an admission that the present invention is not entitled to antedate such disclosure by virtue of prior invention.

What is claimed is:

1. A composition for making an imide oligomer comprising monomer reactants 3,3',4,4'-benzophenone tetracarboxylic dianhydride, 2-(3,4-dicarboxy phenyl)-1-phenylacetylene anhydride, 1,3-diaminobenzene and 4,4'-(1,3-phenylenediisopropylidene) bisaniline, or derivatives thereof.

2. The imide oligomer composition according to claim 1 wherein the monomer reactants are present in a solution.

3. The imide oligomer composition according to claim 2 wherein an intermediate reactant is in amic acid form.

4. An article comprising the imide oligomer composition according to claim 1.

5. An adhesive comprising the imide oligomer composition according to claim 1.

6. An imide oligomer having the structural formula:

$$[PE]-[AB]_n-A-[PE]$$

wherein:

(i) A is a mixture of 1,3-diaminobenzene and 4,4'-(1,3-phenylenediisopropylidene) bisaniline present in a ratio of about 0.43:1 to about 2.33:1, respectively;

(ii) B is 3,3',4,4'-benzophenone tetracarboxylic dianhydride;

(iii) n is about 0.8 to about 2; and (iv) PE is a 2-(3,4-dicarboxy phenyl)-1-phenylacetylene anhydride functional end-capping agent.

* * * * *